US012107852B2

(12) United States Patent
Nilgiri et al.

(10) Patent No.: US 12,107,852 B2
(45) Date of Patent: Oct. 1, 2024

(54) INTELLIGENT AUTHENTICATION MECHANISM FOR APPLICATIONS

(71) Applicant: Bank of America Corporation, Charlotte, NC (US)

(72) Inventors: Nagarai Nilgiri, Hyderabad (IN); Syed Najumudeen, Telengana (IN); Radhika Vinaikrishnan Nair, Thane (IN); Dalydas Karanath, Kerala (IN)

(73) Assignee: Bank of America Corporation, Charlotte, NC (US)

( * ) Notice: Subject to any disclaimer, the term of this patent is extended or adjusted under 35 U.S.C. 154(b) by 310 days.

(21) Appl. No.: 17/669,715

(22) Filed: Feb. 11, 2022

(65) Prior Publication Data

US 2023/0262053 A1 Aug. 17, 2023

(51) Int. Cl.
*H04L 9/40* (2022.01)

(52) U.S. Cl.
CPC ........ *H04L 63/0861* (2013.01); *H04L 63/107* (2013.01)

(58) Field of Classification Search
CPC .......... H04L 63/0861; H04L 63/107
See application file for complete search history.

(56) References Cited

U.S. PATENT DOCUMENTS

| | | |
|---|---|---|
| 8,370,639 B2 | 2/2013 | Azar et al. |
| 8,558,663 B2 | 10/2013 | Newman et al. |
| 9,147,117 B1 | 9/2015 | Madhu et al. |
| 9,547,763 B1 | 1/2017 | Avital |
| 9,898,610 B1 | 2/2018 | Hadsall |
| 9,953,149 B2 | 4/2018 | Tussy |
| 9,953,231 B1 | 4/2018 | Medina, III et al. |
| 10,042,994 B2 | 8/2018 | Perna et al. |
| 10,095,850 B2 | 10/2018 | Cook et al. |
| 10,154,030 B2 | 12/2018 | Madhu et al. |
| 10,189,677 B2 * | 1/2019 | Bryant ................. G06V 40/172 |
| 10,262,126 B2 | 4/2019 | Tussy |
| 10,268,910 B1 | 4/2019 | Medina, III et al. |
| 10,349,273 B2 | 7/2019 | Seo et al. |

(Continued)

FOREIGN PATENT DOCUMENTS

WO WO-2018232666 A1 * 12/2018

*Primary Examiner* — Mohammad W Reza
(74) *Attorney, Agent, or Firm* — Banner & Witcoff, Ltd.

(57) ABSTRACT

Aspects of the disclosure relate to user authentication. A computing platform may validate, after launch of an application, initial authentication credentials and geolocation information for a user of a client device. The computing platform may cause the client device to activate the integrated camera. The computing platform may receive, from the client device, video information indicating multiple viewpoints from perspectives of the client device, and including any individuals within a predetermined distance of the client device. The computing platform may generate faceprints, each corresponding to one of the individuals within the predetermined distance. The computing platform may compare, using an AI engine, the faceprints to stored faceprints of authenticated users. Based on identifying that at least one of the individuals is not authenticated, the computing platform may mask an application user interface for the application. The computing platform may direct the client device to display the masked application user interface.

20 Claims, 13 Drawing Sheets

(56) References Cited

U.S. PATENT DOCUMENTS

| | | |
|---|---|---|
| 10,614,204 B2 | 4/2020 | Tussy |
| 10,754,939 B2 | 8/2020 | Farkash et al. |
| 10,762,368 B2 | 9/2020 | Lin |
| 10,776,471 B2 | 9/2020 | Tussy |
| 10,853,469 B1 * | 12/2020 | McNamara ............ G06F 3/0488 |
| 10,868,809 B2 | 12/2020 | Madhu et al. |
| 10,990,805 B2 | 4/2021 | Kalscheur et al. |
| 10,997,445 B2 | 5/2021 | Lin |
| 11,157,606 B2 | 10/2021 | Tussy |
| 2016/0267760 A1 * | 9/2016 | Trani ..................... G07C 9/28 |
| 2018/0337917 A1 * | 11/2018 | Wallace ................ G06V 40/70 |
| 2023/0196830 A1 * | 6/2023 | Weksler ................ G06V 10/17 |
| | | 348/77 |

* cited by examiner

405

Sensitive Application Interface

Account Number: Account #1
Name: Person #1
Holdings: Holding #1, Holding #2, Holding #3
Account Balance: $$$

505

Masked Application Interface

INTELLIGENT AUTHENTICATION MECHANISM FOR APPLICATIONS

BACKGROUND

Aspects of the disclosure relate to computing hardware and software, particularly distributed computing hardware and software configured for authentication and information display. In some instances, enterprise users may launch an application, and may be prompted for log in credentials such as a user name and password. Once authenticated via the log in credentials, the users may be granted access to the application. However, in some instances, once initial access is granted to the user, other unauthenticated users (who may e.g., enter and leave a room, shift positions within a room, or the like) may be able to view the application. In some instances, such applications may display confidential or otherwise sensitive information. Given the importance of information security, it may be important to prevent access to such sensitive information by unauthorized users.

SUMMARY

Aspects of the disclosure provide effective, efficient, scalable, and convenient technical solutions that address and overcome the technical problems associated with user authentication and interface masking. In accordance with one or more embodiments of the disclosure, a computing platform comprising at least one processor, a communication interface, and memory storing computer-readable instructions may validate, after launch of an application, initial authentication credentials for a user of a client device. After validating the initial authentication credentials, the computing platform may validate geolocation information of the client device. After validating the geolocation information of the client device, the computing platform may send one or more commands directing the client device to activate an integrated camera, which may cause the client device to activate the integrated camera. The computing platform may receive, from the client device, video information indicating multiple viewpoints from perspectives of the client device, and including any individuals within a predetermined distance of the client device. The computing platform may generate, from the video information, one or more faceprints, each corresponding to one of the individuals within the predetermined distance of the client device. The computing platform may compare, using an artificial intelligence (AI) engine the one or more faceprints to stored faceprints of authenticated users. Based on identifying that at least one of the individuals is not authenticated, the computing platform may mask an application user interface for the application. The computing platform may send, to the client device, one or more commands directing the client device to display the masked application user interface, which may cause the client device to display the masked application user interface.

In one or more instances, the computing platform may fail to validate, for a second user, the initial authentication credentials. Based on failing to validate the initial authentication credentials for the second user, the computing platform may: 1) mask the application user interface for the application, and 2) send, to the client device, the one or more commands directing the client device to display the masked application user interface, which may cause the client device to display the masked application user interface.

In one or more examples, the computing platform may fail to validate, for a second user, the geolocation information. Based on failing to validate the geolocation information for the second user, the computing platform may: 1) mask the application user interface for the application, and 2) send, to the client device, the one or more commands directing the client device to display the masked application user interface, which may cause the client device to display the masked application user interface.

In one or more instances, based on identifying that all of the individuals are authenticated, the computing platform may determine that the application user interface for the application may be displayed. The computing platform may send, to the client device, one or more commands directing the client device to display the application user interface, which may cause the client device to display the application user interface.

In one or more examples, the computing platform may receive historical image information comprising images of users and corresponding labels indicating whether or not the corresponding user is authenticated. The computing platform may train, using the historical image information, the AI engine to distinguish between authenticated and non-authenticated users based on the one or more faceprints.

In one or more instances, the computing platform may receive historical application sensitivity information comprising application names and corresponding labels indicating whether or not the corresponding applications include sensitive data. The computing platform may train, using the historical application sensitivity information, the AI engine to distinguish between applications that include the sensitive data and non-sensitive data based on current application sensitivity information.

In one or more examples, the computing platform may determine, using the AI engine, whether the application includes the sensitive data, and validating the initial authentication credentials may be in response to determining that the application includes sensitive data. In one or more examples, the AI engine may be a convolutional neural network (CNN).

In one or more instances, masking the application user interface may include inputting the application user interface into a chaotic sha-3 algorithm to transform the application user interface to greyscale, and inputting the application user interface into the chaotic sha-3 algorithm may include: 1) scrambling pixel values of the application user interface based on a chaotic parameter input for each pixel, 2) compressing the scrambled pixel values using batch normalization, and 3) pooling the compressed scrambled pixel values.

In one or more examples, the scrambled pixel values may be uncorrelated. In one or more examples, the computing platform may decrypt the masked application user interface using the chaotic parameter input.

In one or more instances, new video information may be continuously analyzed by the computing device to detect a presence of a new individual within the predetermined distance, and the authentication process may be repeated based on detection of the presence of the new individual.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
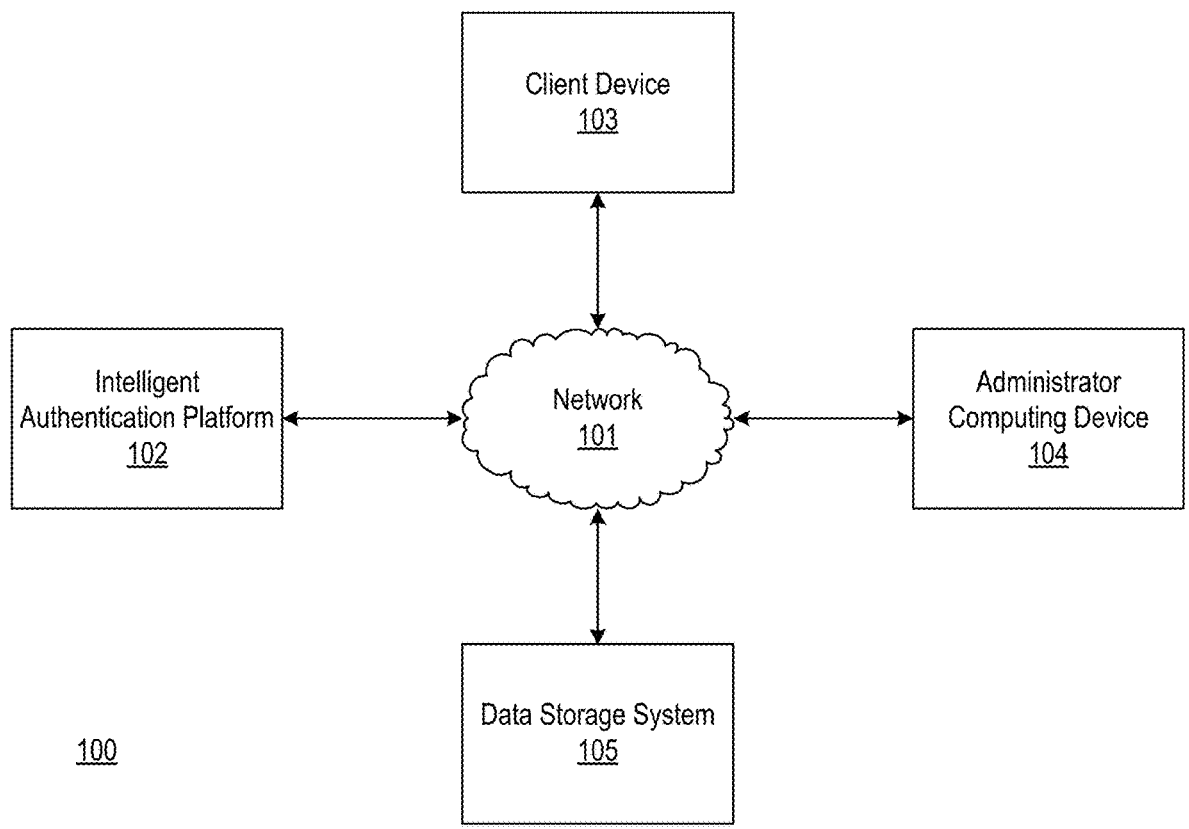
FIGS. 1A-1B depict an illustrative computing environment configured to provide improved user authentication and interface masking in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to improved user authentication and interface masking. For example, information security may be an integral part of enterprise organizations. Accordingly, it may be important to modify security protocols to avoid security breaches.

Authentication methods may be restricted to the input of log in credentials, and access may be governed by rights assigned to the used who may be authenticated. However, although there may be procedures for initial log-in, further checks might not be performed to verify if the applications, system screens, and/or terminals are being viewed by the same authorized personnel or not. Such absence of a fool proof method to prevent unauthorized access may be a gap in current access security frameworks.

In some instances, applications such as trading applications may have access to sensitive customer data (e.g., unique user identifier, account details, or the like), which may benefit from enhanced security and/or authorization mechanisms. An intelligent authentication mechanism may be powered by a deep learning algorithm, and may be aimed at incorporating facial recognition as a way of recognizing a human face. Accordingly, personal identity may be verified throughout the application usage. Restrictions from other viewing angles and geolocation may be additional parameters used to validate the authentication. Upon failure of authentication, the application window may be masked.

In some instances, the intelligent authentication mechanism may be able to detect fake video (e.g., poor pixel clarity, a separate video clip of an individual, or the like). The solution may feed intermittent visual snippets of the user to the intermittent real-time facial module, which may validate the user by comparing it with the recent video snippet when the user is moving in and out from the application, device, or otherwise from the video frame.

Accordingly, access control and continuous authentication of applications may be performed for users/employees performing financial transactions by implementing an intermittent real time facial identification as an authentication mechanism for critical front-end applications. Accordingly, the application might not be viewed by others from any other viewing angle (e.g., by implementing a chaotic sha-3 algorithm) other than the authenticated user in front of the webcam. Additionally, the user's geolocation may be a parameter to authenticate and view the application to prevent any form of unauthorized access or hacking from other regions. In some instances, the application front end may be masked if any of the above authentication fails.

These and other features are described in further detail below.

Figure 1B:
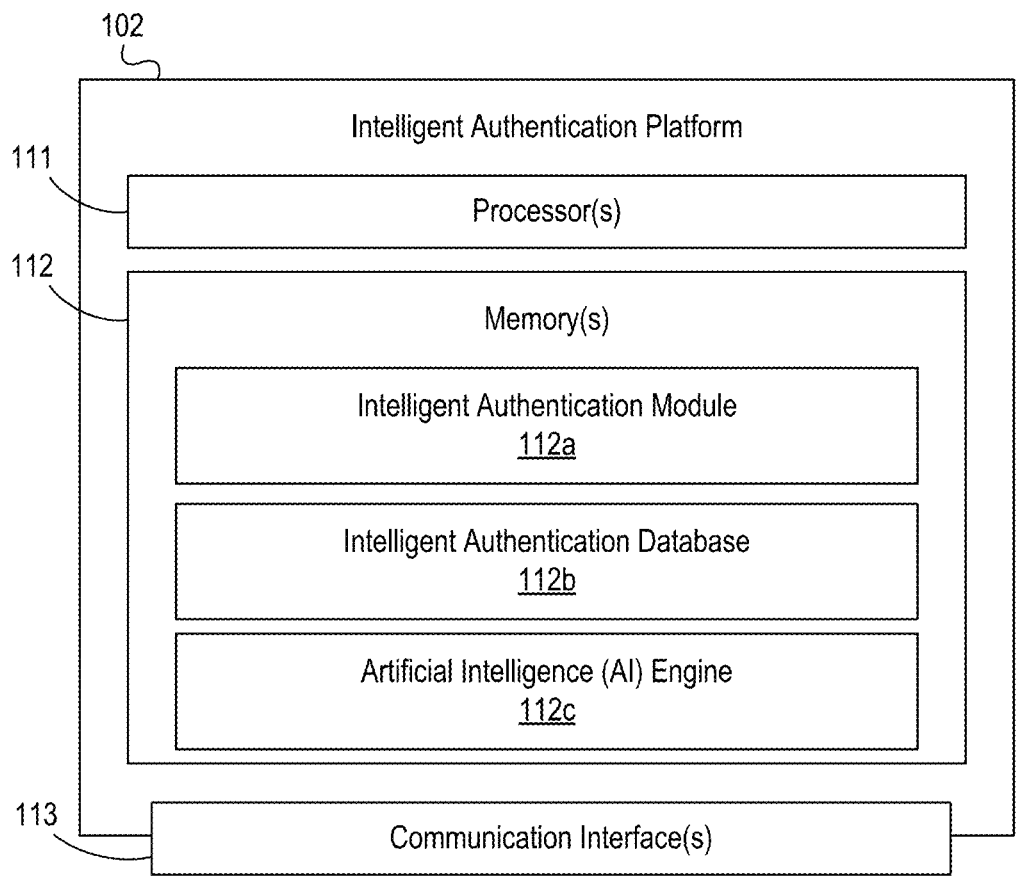

FIGS. 1A-1B depict an illustrative computing environment that provides improved user authentication and interface masking in accordance with one or more example embodiments. Referring to FIG. 1A, computing environment 100 may include one or more computer systems. For example, computing environment 100 may include intelligent authentication platform 102, client device 103, administrator computing device 104, and data storage system 105.

As described further below, intelligent authentication platform 102 may be a computer system that includes one or more computing devices (e.g., servers, server blades, or the like) and/or other computer components (e.g., processors, memories, communication interfaces) that may be used to perform user authentication and mask user interfaces as described further below. In these instances, the intelligent authentication platform 102 may be configured to train, host, and/or otherwise maintain an artificial intelligence engine that may be used to identify sensitive applications, authenticate users based on faceprints, and/or perform other functions.

Client device 103 may be and/or otherwise include one or more devices such as a laptop computer, desktop computer, mobile device, tablet, smartphone, and/or other device that may be used by an individual to access an application interface (which may, in some instances, include sensitive information). In some instances, the client device 103 may be configured to receive user input requesting access to one or more applications, some of which may include sensitive data. The client device 103 may be configured to launch such applications, and prompt for authentication. In some instances, the client device 103 may be configured with a web camera and/or other video or photo camera configured to capture video and/or images from different perspectives of the client device 103. In some instances, client device 103 may be configured to display one or more user interfaces (e.g., application interfaces, masked application interfaces, or the like). Although a single client device 103 is shown, any number of such devices may be deployed in the systems/methods described below without departing from the scope of the disclosure.

Administrator computing device 104 may be and/or otherwise include one or more devices such as a laptop computer, desktop computer, mobile device, tablet, smartphone, and/or other device that may be used by an individual to monitor network or system security. In some instances, the administrator computing device 104 may be configured to display one or more user interfaces (e.g., application interfaces, masked application interfaces, or the like). Although an administrator computing device 104 is shown, any number of such devices may be deployed in the systems/methods described below without departing from the scope of the disclosure.

Data storage system 105 may be and/or otherwise include one or more computing devices (e.g., servers, server blades, and/or other devices) and/or other computer components (e.g., processors, memories, communication interfaces) that may be used to train the artificial intelligence engine of the intelligent authentication platform 102. For example, data storage system 105 may be configured to store historical application information, faceprints, and/or other information, and may be configured to communicate with the intelligent authentication platform 102.

Computing environment 100 also may include one or more networks, which may interconnect intelligent authentication platform 102, client device 103, administrator computing device 104, and/or data storage system 105. For example, computing environment 100 may include a network 101 (which may interconnect, e.g., intelligent authentication platform 102, client device 103, administrator computing device 104, and/or data storage system 105).

In one or more arrangements, intelligent authentication platform 102, client device 103, administrator computing device 104, and/or data storage system 105 may be any type of computing device capable of sending and/or receiving requests and processing the requests accordingly. For example, intelligent authentication platform 102, client device 103, administrator computing device 104, data storage system 105, and/or the other systems included in computing environment 100 may, in some instances, be and/or include server computers, desktop computers, laptop computers, tablet computers, smart phones, and/or other devices that may include one or more processors, memories, communication interfaces, storage devices, and/or other components. As noted above, and as illustrated in greater detail below, any and/or all of intelligent authentication platform 102, client device 103, administrator computing device 104, and/or data storage system 105 may, in some instances, be special-purpose computing devices configured to perform specific functions.

Referring to FIG. 1B, intelligent authentication platform 102 may include one or more processors 111, memory 112, and communication interface 113. A data bus may interconnect processor 111, memory 112, and communication interface 113. Communication interface 113 may be a network interface configured to support communication between intelligent authentication platform 102 and one or more networks (e.g., network 101, or the like). Memory 112 may include one or more program modules having instructions that when executed by processor 111 cause intelligent authentication platform 102 to perform one or more functions described herein and/or one or more databases that may store and/or otherwise maintain information which may be used by such program modules and/or processor 111. In some instances, the one or more program modules and/or databases may be stored by and/or maintained in different memory units of intelligent authentication platform 102 and/or by different computing devices that may form and/or otherwise make up intelligent authentication platform 102. For example, memory 112 may have, host, store, and/or include intelligent authentication module 112a, intelligent authentication database 112b, and/or artificial intelligence (AI) engine 112c.

Intelligent authentication module 112a may have instructions that direct and/or cause intelligent authentication platform 102 to execute advanced techniques for user authentication and interface masking, as discussed in greater detail below. Intelligent authentication database 112b may be or include. Artificial intelligence engine 112c may have instructions that direct and/or cause the intelligent authentication platform 102 to perform user authentication, interface masking, and/or to set, define, and/or iteratively refine optimization rules and/or other parameters used by the intelligent authentication platform 102 and/or other systems in computing environment 100.

Figure 2A:
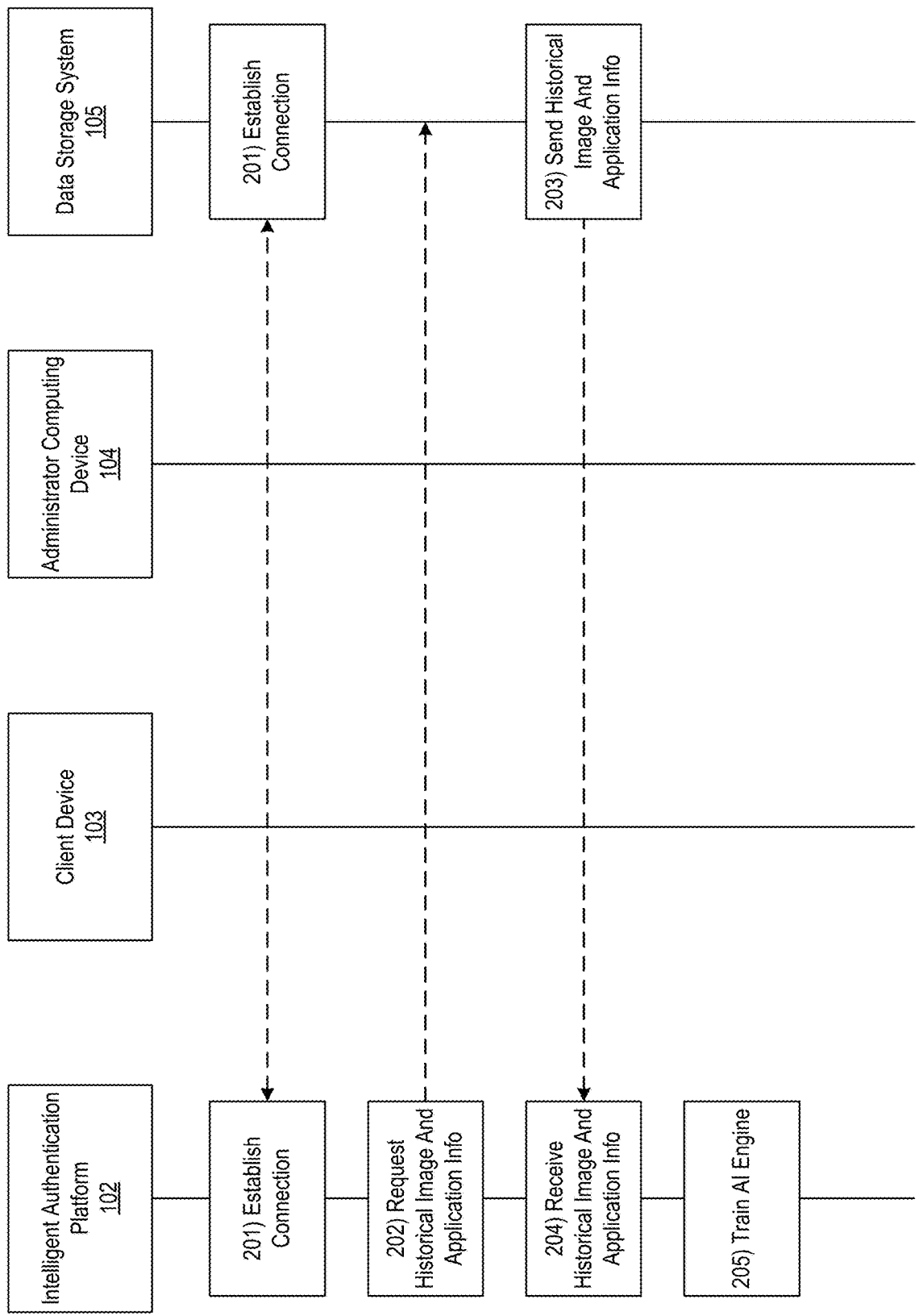
FIGS. 2A-2H depict an illustrative event sequence for improved user authentication and interface masking in accordance with one or more example embodiments.

FIGS. 2A-2H depict an illustrative event sequence for improved user authentication and interface masking in accordance with one or more example embodiments. Referring to FIG. 2A, at step 201, the intelligent authentication platform 102 may establish a connection with the data storage system 105. For example, the intelligent authentication platform 102 may establish a first wireless data connection with the data storage system 105 to link the intelligent authentication platform 102 to the data storage system 105 (e.g., in preparation for requesting historical information). In some instances, the intelligent authentication platform 102 may identify whether or not a connection is already established with the data storage system 105. If a connection is already established with the data storage system 105, the intelligent authentication platform 102 might not re-establish the connection. If a connection is not yet established with the data storage system 105, the intelligent authentication platform 102 may establish the first wireless data connection as described herein.

At step 202, the intelligent authentication platform 102 may request historical information from the data storage system 105. For example, the intelligent authentication platform 102 may request historical images such as images of enterprise employees who may have authorization (or at least some level of authorization) within the enterprise to view application interfaces that include sensitive information (e.g., account numbers, unique user identifiers, account balances, account holdings, credentials, and/or other sensitive information). In addition, the intelligent authentication platform 102 may request historical application information indicating information displayed by, accessed, or otherwise affiliated with various applications, which may e.g., be either sensitive or non-sensitive. For example, information for a trading application may indicate that it is sensitive, whereas information for a web browser might not be sensitive. In some instances, the intelligent authentication platform 102 may request the historical image and application information via the communication interface 113 and while the first wireless data connection is established.

At step 203, the data storage system 105 may send the requested historical information (e.g., historical image information and historical application information) to the intelligent authentication platform 102. For example, the data storage system 105 may send the requested historical information to the intelligent authentication platform 102 while the first wireless data connection is established.

At step 204, the intelligent authentication platform 102 may receive the historical information sent at step 203. For example, the intelligent authentication platform 102 may receive the historical image information and historical application information via the communication interface 113 and while the first wireless data connection is established.

At step 205, the intelligent authentication platform 102 may train the AI engine 112c using the historical image information and the historical application information. For example, the intelligent authentication platform 102 may feed the historical image information, which may, e.g., include images of both authorized and/or unauthorized individuals, and corresponding labels indicating whether or not the corresponding image depicts an authorized or unauthorized individual, into the AI engine 112c. This may train the AI engine 112c (which may, e.g., be a supervised learning engine) to distinguish between authorized and unauthorized individuals, in real time, based on historical labelled data. In some instances, in training the AI engine 112c, the intelligent authentication platform 102 may train a convolutional neural network (CNN).

In addition, the intelligent authentication platform 102 may input the historical application information into the AI engine 112c, along with corresponding labels indicating an associated application name and whether or not that application displays or includes sensitive information. This may train the AI engine 112c (once again, in a supervised learning process) to distinguish between applications that use, display, or otherwise implement sensitive data, and those that do not. Once the AI engine 112c is trained, it may be used to perform authentication and/or grant application access accordingly, as described further below.

Figure 2B:
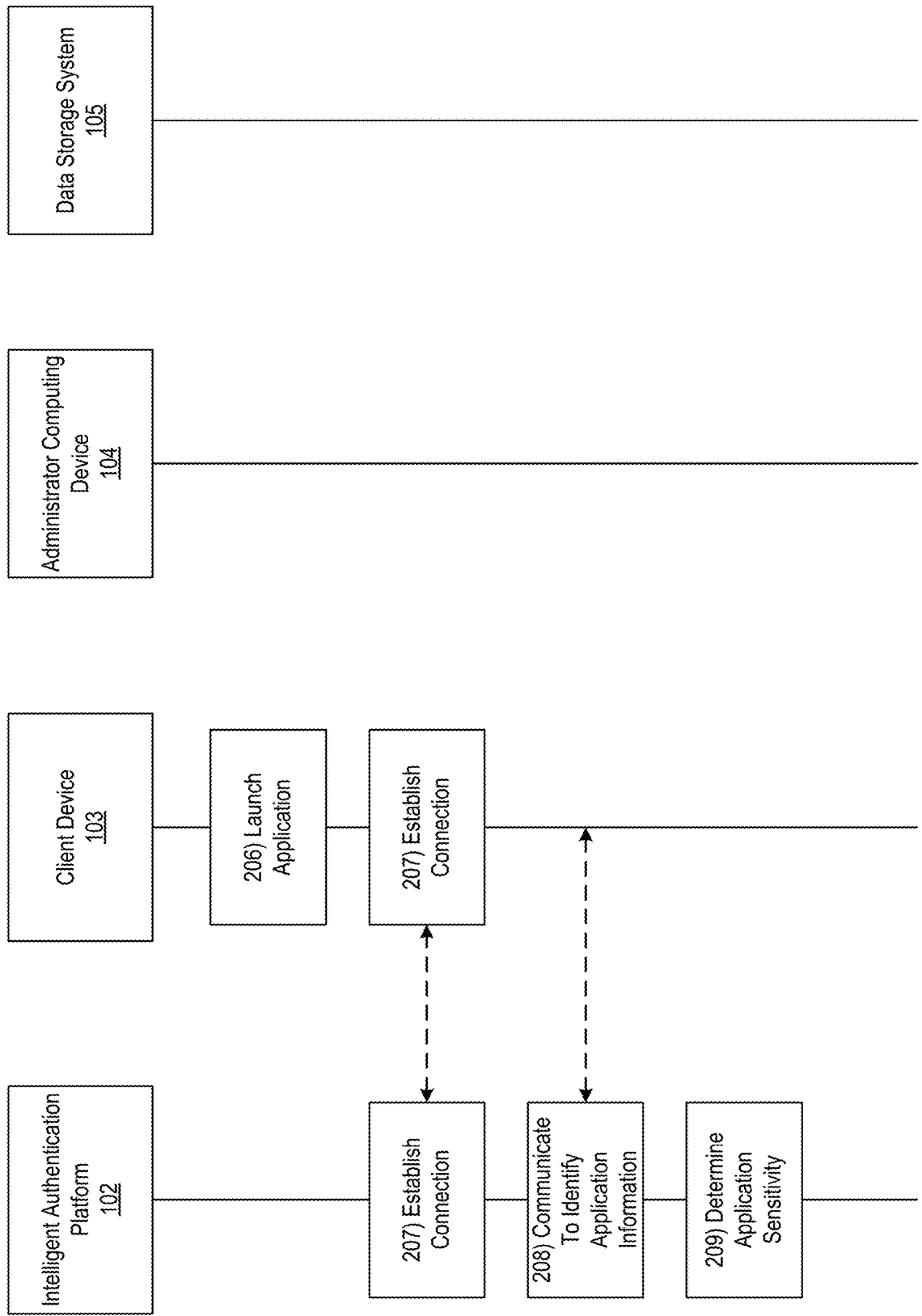

Referring to FIG. 2B, at step 206, the client device 103 may launch an application. In some instances, the client device 103 may automatically launch the application, or may launch the application in response to a user input requesting that the application be launched. In some instances, the client device 103 may launch an application that includes or otherwise displays sensitive data (e.g., banking application, trading application, sensitive messaging application, and/or other sensitive application), or may launch an application that does not include such sensitive data (e.g., web browser, video conferencing, word processor, slide deck application, and/or other non-sensitive applications).

At step 207, the client device 103 may establish a connection with the intelligent authentication platform 102. For example, the client device 103 may establish a second wireless data connection to link the client device 103 to the intelligent authentication platform 102 (e.g., in preparation for communicating information of the launched application). In some instances, the client device 103 may identify whether or not a connection is already established with the intelligent authentication platform 102. If a connection is already established with the intelligent authentication platform 102, the client device 103 might not establish the connection. If a connection is not yet established with the intelligent authentication platform 102, the client device 103 may establish the second wireless data connection as described herein.

At step 208, the client device 103 may communicate with the intelligent authentication platform 102 to provide information of the launched application that may be used to determine its sensitivity. For example, the client device 103 may share an application name, information about the application (e.g., data used or otherwise displayed by the application), and/or other information.

At step 209, the intelligent authentication platform 102 may feed the application information, received at step 208, into the AI engine 112c. In doing so, the AI engine 112c may analyze the application information using supervised learning techniques (e.g., a CNN), which may compare the application information to historical application information stored in the AI engine 112c to identify whether the launched application includes sensitive information or not. If the intelligent authentication platform 102 determines that the application does not include sensitive information, it may proceed to step 226. In doing so, the intelligent authentication platform 102 may conserve processing resources by only applying further authentication and/or masking techniques for sensitive applications. If the intelligent authentication platform 102 determines that the application does include sensitive information, it may proceed to step 210.

Figure 2C:
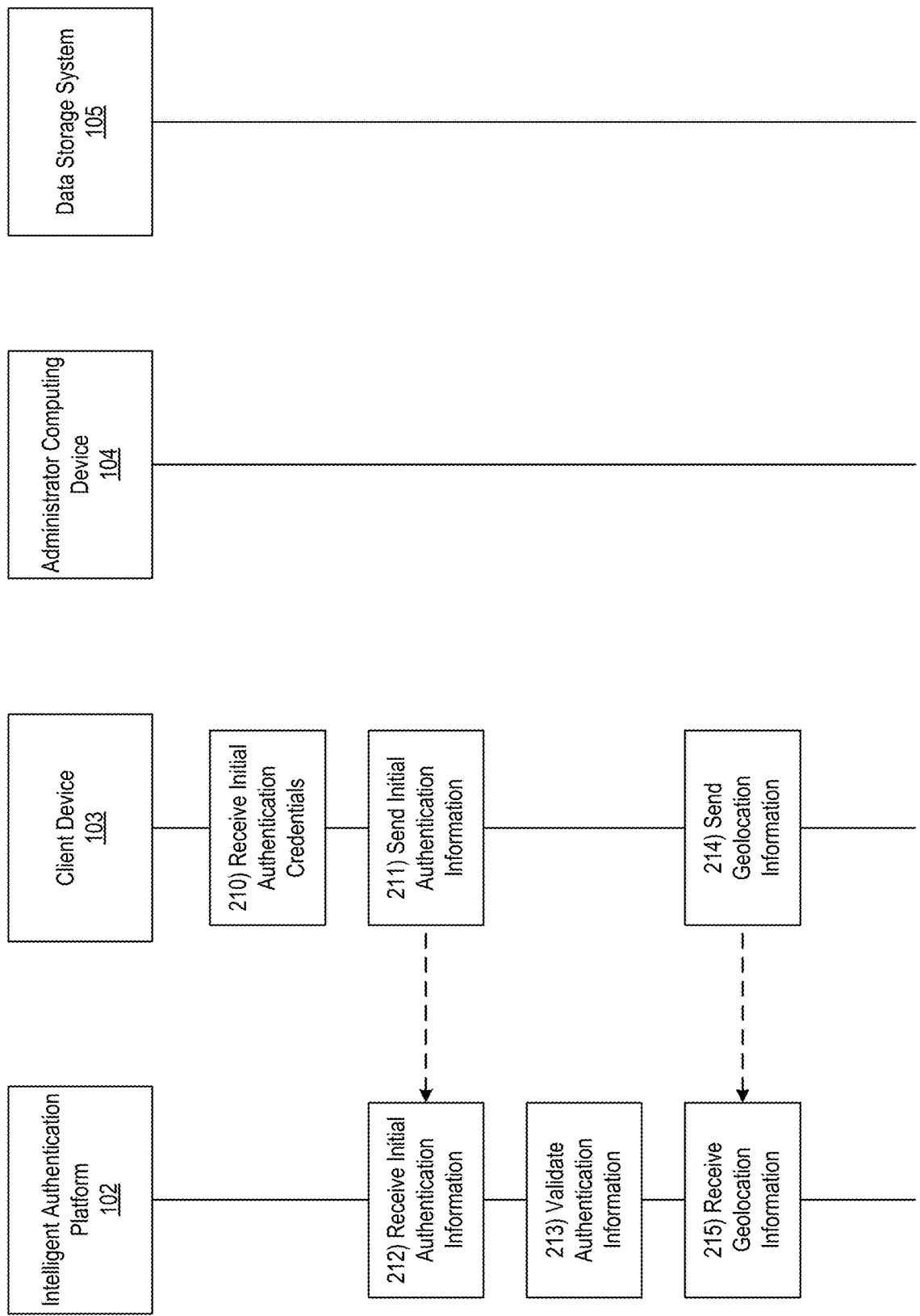

Referring to FIG. 2C, at step 210, the client device 103 may receive initial authentication credentials for the application. For example, the client device 103 may receive a user name and password combination, authentication token, and/or other authentication mechanism (e.g., via a user interface of the client device 103).

At step 211, the client device 103 may send initial authentication information to the intelligent authentication platform 102 (e.g., based on the initial authentication credentials). For example, the client device 103 may send the initial authentication information to the intelligent authentication platform 102 while the second wireless data connection is established.

At step 212, the intelligent authentication platform 102 may receive the initial authentication information sent at step 211. For example, the intelligent authentication platform 102 may receive the initial authentication information via the communication interface 113 and while the second wireless data connection is established.

At step 213, the intelligent authentication platform 102 may attempt to validate the initial authentication information received at step 212. For example, the intelligent authentication platform 102 may compare the received authentication information to anticipated or otherwise previously validated authentication information. If the intelligent authentication platform 102 identifies that the initial authentication information is invalid, the intelligent authentication platform 102 may proceed to step 229. In doing so, the intelligent authentication platform 102 may conserve processing resources by avoiding further authentication mechanisms if the initial authentication information is invalid. If the intelligent authentication platform 102 identifies that the initial authentication information is valid, it may proceed to step 214.

At step 214, the client device 103 may send geolocation information (e.g., of the client device 103) to the intelligent authentication platform 102. For example, the client device 103 may send the geolocation information to the intelligent authentication platform 102 while the second wireless data connection is established.

At step 215, the intelligent authentication platform 102 may receive the geolocation information sent at step 214. For example, the intelligent authentication platform 102 may receive the geolocation information via the communication interface 113 and while the second wireless data connection is established.

Figure 2D:
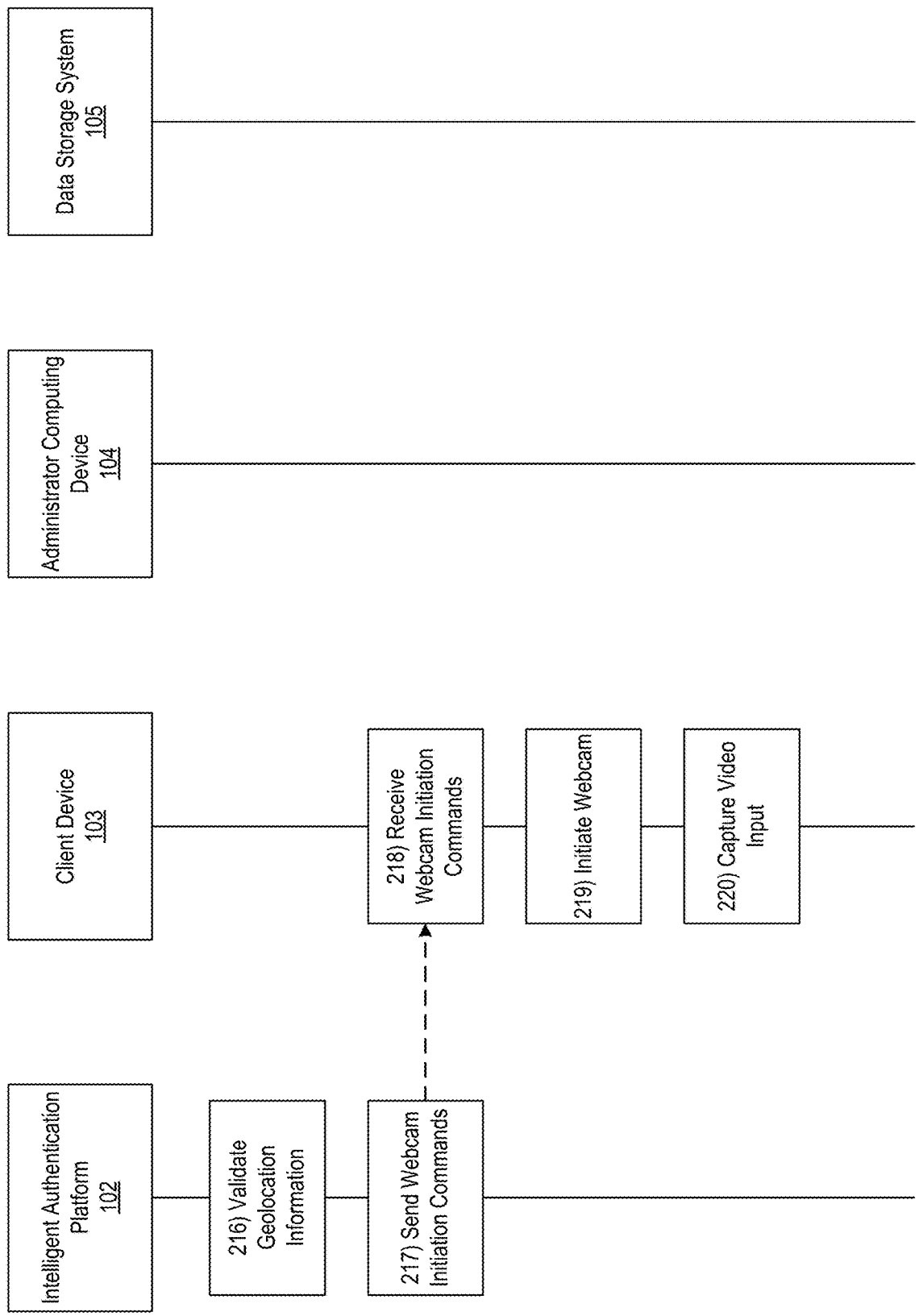

Referring to FIG. 2D, at step 216, the intelligent authentication platform 102 may validate the geolocation information. For example, the intelligent authentication platform 102 may compare the geolocation information against a known list of valid geolocations, which may, e.g., correspond to office locations of the enterprise or other trusted locations. If the intelligent authentication platform 102 determines that the geolocation information is invalid, the intelligent authentication platform 102 may proceed to step 229. In doing so, the intelligent authentication platform 102 may conserve processing resources by avoiding further authentication mechanisms if the geolocation information is invalid. If the intelligent authentication platform 102 determines that the geolocation information is valid, the intelligent authentication platform 102 may proceed to step 217.

At step 217, the intelligent authentication platform 102 may send one or more commands to the client device 103 directing the client device 103 to activate an integrated or otherwise connected camera (e.g., webcam, video camera, photo camera, or other camera). In some instances, the intelligent authentication platform 102 may send the camera initiation commands to the client device 103 via the communication interface 113 and while the second wireless data connection is established.

At step 218, the client device 103 may receive the camera initiation commands sent at step 217. For example, the client device 103 may receive the camera initiation commands while the second wireless data connection is established.

At step 219, based on or in response to the camera initiation commands, the client device 103 may activate the camera. For example, the client device 103 may configure the camera to capture video frame, photos, and/or other information at a plurality of perspectives (e.g., of the client device 103). For example, in some instances, the camera may be configured to rotate up and down and/or from side to side to capture additional perspectives.

At step 220, the client device 103 may use the camera to capture video input. For example, the client device 103 may capture video footage from multiple perspectives, which may, in some instances include one or more individuals within a predetermined distance of the client device 103 (and thus, may, in some instances, hypothetically be able to view content displayed at the client device). For example, the client device 103 may capture video input that includes a user of the client device 103, who may be directly in front of the client device 103, and/or one or more individuals in the background, to the side, and/or otherwise present within the predetermined distance of the client device 103.

Figure 2E:
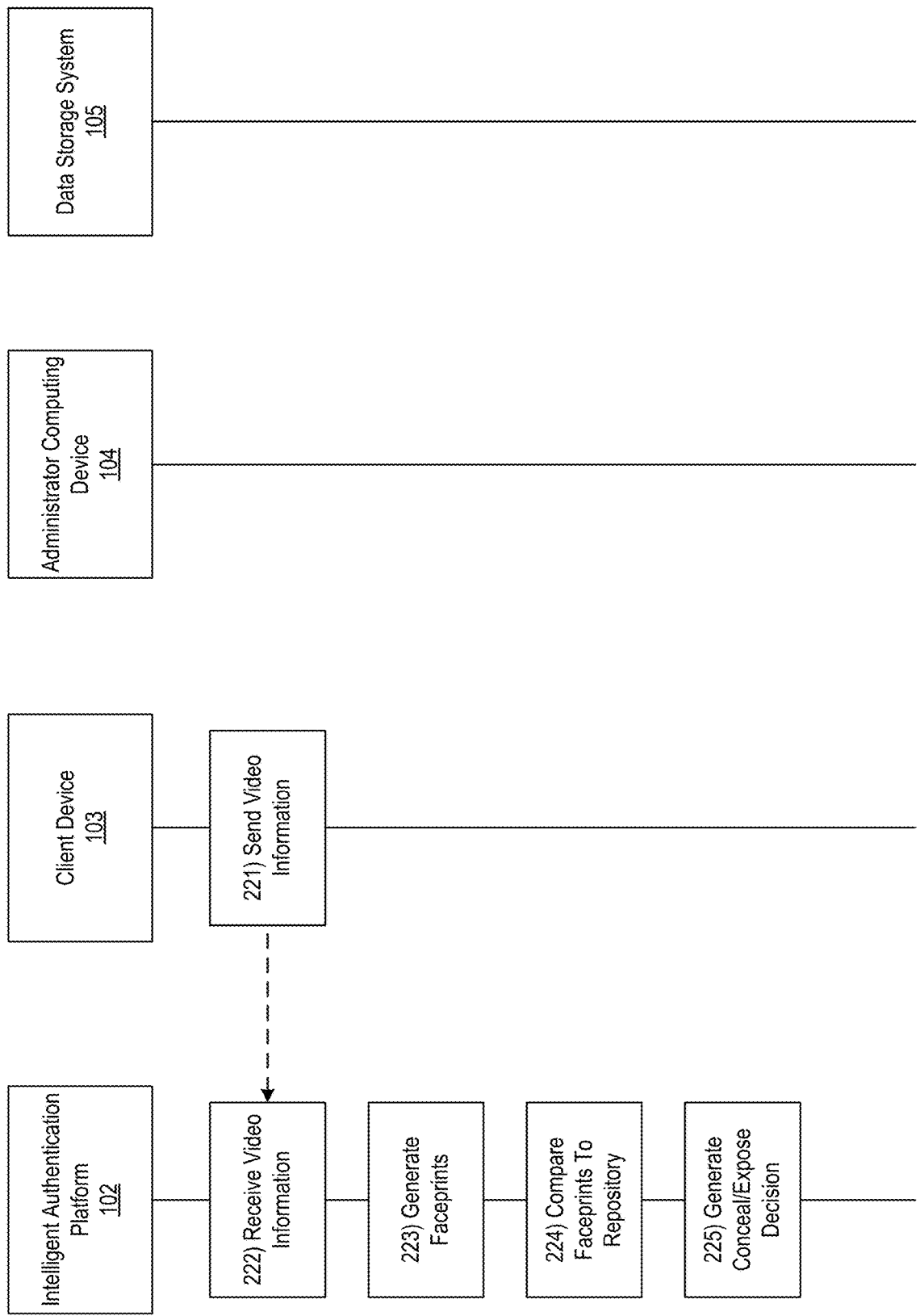

Referring to FIG. 2E, at step 221, the client device 103 may send video information (e.g., the video input captured at step 220) to the intelligent authentication platform 102. For example, the client device 103 may send the video information to the intelligent authentication platform 102 via the communication interface 113 and while the second wireless data connection is established.

At step 222, the intelligent authentication platform 102 may receive the video information sent at step 221. For example, the intelligent authentication platform 102 may receive the video information via the communication interface 113 and/or while the second wireless data connection is established.

At step 223, the intelligent authentication platform 102 may generate faceprints based on the video information. For example, the intelligent authentication platform 102 may perform one or more facial recognition techniques to identify one or more individuals within view of the client device 103, and to generate images of these individuals that may be compared to the stored/authenticated historical image information of the AI engine 112c. In some instances, in identifying the one or more individuals, the intelligent authentication platform 102 may also tag each faceprint based on a perspective of the corresponding individual (e.g., is the individual directly in front of the client device 103 (e.g., a user of the client device 103), an onlooker next to the user of the client device 103, located in the periphery, or otherwise located within the predetermined distance of the client device 103).

At step 224, the intelligent authentication platform 102 may compare the faceprints, generated at step 223, to the historical image information of the AI engine 112c. For example, the intelligent authentication platform 102 may feed the faceprints into the AI engine 112c, which may use one or more supervised learning techniques (e.g., such as CNN) to identify whether individuals corresponding to the faceprints are authenticated. For example, if the intelligent authentication platform 102 detects a match between at least one faceprint and the authenticated historical image information, the intelligent authentication platform 102 may determine that individuals corresponding to the at least one faceprint are authenticated. If the intelligent authentication platform 102 does not detect a match between at least one faceprint and the authenticated historical image information (and/or detects a match between at least one faceprint and the authenticated historical image information), the intelligent authentication platform may determine that individuals corresponding to the at least one faceprint are not authenticated. In some instances, the intelligent authentication platform 102 may determine that all individuals are authenticated, some individuals are authenticated/others are not authenticated, or that all individuals are not authenticated.

At step 225, the intelligent authentication platform 102 may generate one or more decisions about whether to conceal or expose the application interface based on the authentication results of the faceprint matching at step 224. For example, if the intelligent authentication platform 102 determined that all individuals are authenticated, the intelligent authentication platform 102 may determine that the application interface may be displayed in its regular state, and may proceed to step 226. If the intelligent authentication platform 102 determined that all individuals were not authenticated, the intelligent authentication platform 102 may determine that the application interface should be masked, and may proceed to step 229. If the intelligent authentication platform 102 determined that some individuals were authenticated and others were not, the intelligent authentication platform 102 may determine that the application interface should be masked (to the extent possible) from those not authenticated individuals, while displaying the application interface in its regular state to the authenticated individuals (e.g., the application interface may appear masked to those viewing from the periphery, but might not be masked to a direct user of the client device 103). In these instances, the intelligent authentication platform 102 may perform a hybrid masking procedure that may include the steps of both the normal display process of steps 226-228 and the masking procedure of steps 229-232.

Figure 2F:
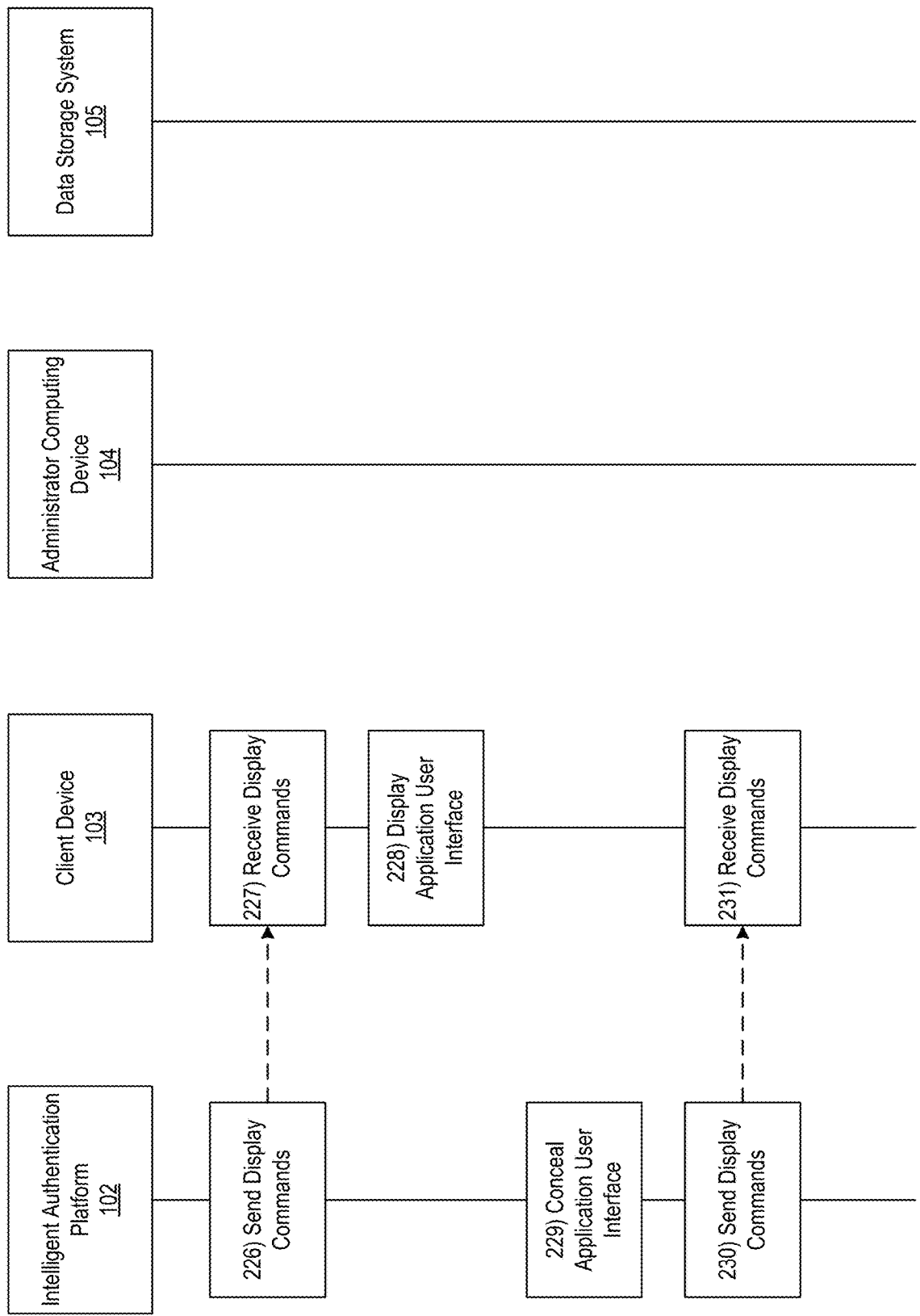

Referring to FIG. 2F, at step 226, the intelligent authentication platform 102 may send one or more commands to the client device 103 directing the client device to display the application interface in its regular state (e.g., not masked) (e.g., based on a determination that all users are authenticated). For example, the intelligent authentication platform 102 may send the one or more application display commands to the client device 103 via the communication interface 113 and while the second wireless data connection is established.

In some instances, the intelligent authentication platform 102 might not have previously masked the application user interface, and thus may proceed with directing the client device 103 to display the application interface accordingly as described above. However, in some instances, the intelligent authentication platform 102 may have previously masked the application user interface, and thus might need to unmask/decrypt the application user interface prior to directing the client device 103 to display it. In these instances, the intelligent authentication platform 102 may use convolutional decoding, batch normalization, upsampling, and/or softmax methods to decrypt the masked application user interface. As described below, in some instances, pixels of the original image may have been scrambled and encoded using a chaotic parameter for increased security. In these instances, the intelligent authentication platform 102 may use this chaotic parameter to revert the previously scrambled pixels to their original state, which may result in the original application user interface. Once decrypted, the intelligent authentication platform 102 may direct the client device 103 to display the application user interface accordingly.

At step 227, the client device 103 may receive the one or more application display commands sent at step 226. For example, the client device 103 may receive the one or more application display commands while the second wireless data connection is established.

Figures 4, 5:
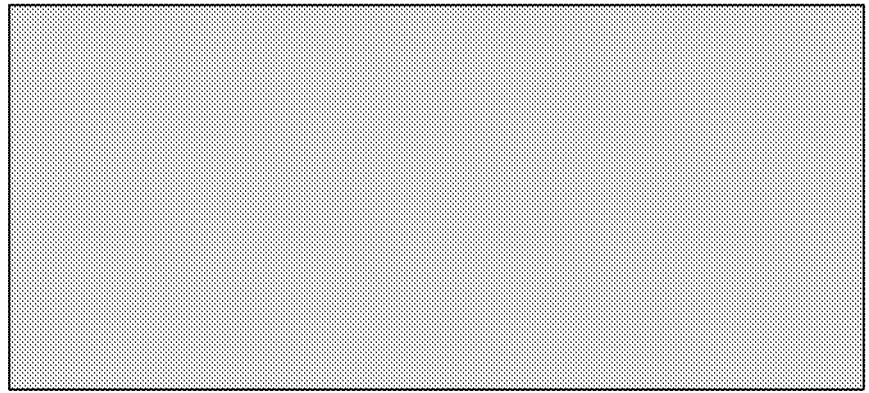
FIGS. 4-6 depict illustrative graphical user interfaces/notifications associated with improved user authentication and interface masking in accordance with one or more example embodiments.

At step 228, based on or in response to the one or more application display commands, the client device 103 may display the application user interface in its regular, unmasked state (which may, e.g., include sensitive information). For example, the client device 103 may display a graphical user interface similar to graphical user interface 405, which is shown in FIG. 4, and which depicts the interface of a sensitive application. If no masking is to be performed, the event sequence may then proceed to step 237.

At step 229, the intelligent authentication platform 102 may mask the application user interface (e.g., based on a determination that all users are not authenticated). For example, the intelligent authentication platform 102 may feed the application user interface into a chaotic sha-3 algorithm, which may use convolutional encoding, batch normalization, and pooling to encode the application user interface. In doing so, the intelligent authentication platform 102 may produce a greyscale image, which might not reveal any sensitive information, which might otherwise be displayed on the application user interface. In some instances, the intelligent authentication platform 102 may perform scrambling of the original application user interface image, and may encrypt each scrambled pixel using a chaotic parameter (which may, e.g., be automatically and/or randomly generated, input by a user, or otherwise generated). In these instances, the intelligent authentication platform 102 may scramble the pixel values of the application user interface based on the chaotic parameters, compress the scrambled pixel values using batch normalization, and pool the compressed scrambled pixel values. In these instances, scrambling the pixel values may result in an uncorrelated group of pixel values. Combining this technique of scrambling with the implementation of the chaotic sha-3 algorithm may provide a technical improvement over any existing image masking techniques by introducing a further level of security (e.g., the chaotic parameter), which may be needed to subsequently decrypt the application user interface (and which may thus increase security accordingly).

At step 230, the intelligent authentication platform 102 may send one or more commands directing the client device 103 to display the masked application interface. For example, the intelligent authentication platform 102 may send the one or more masked application display commands via the communication interface 113 and while the second wireless data connection is established.

At step 231, the client device 103 may receive the one or more masked application display commands sent at step 230. For example, the client device 103 may receive the one or more masked application display commands while the second wireless data connection is established.

Figure 2G:
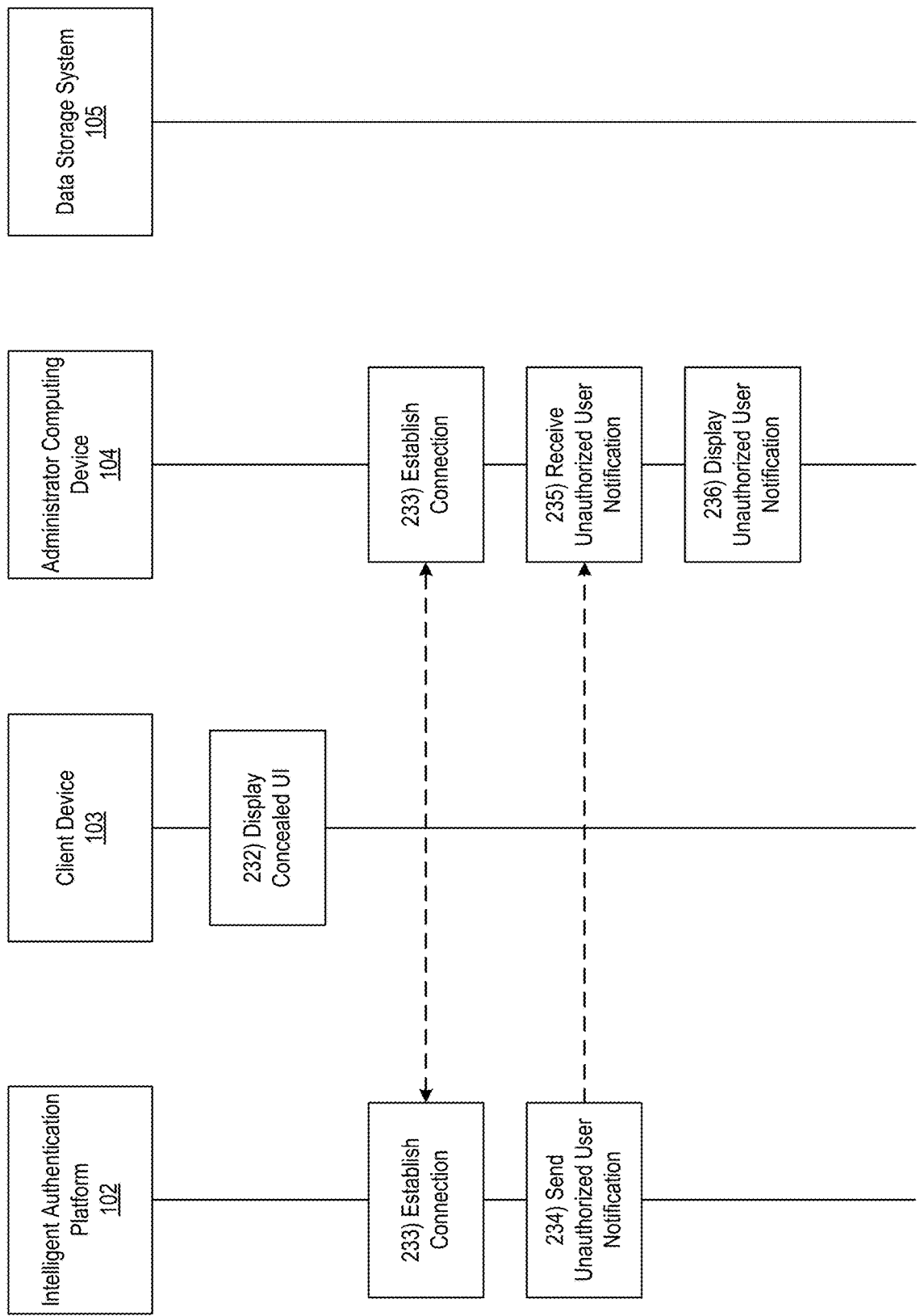

Referring to FIG. 2G, at step 232, based on or in response to the one or more masked application display commands, the client device 103 may display the masked application interface (which may, e.g., be a greyscale interface in which any sensitive information is masked). For example, the client device 103 may display a graphical user interface similar to graphical user interface 505, which is shown in FIG. 5, and which comprises a greyscale image.

At step 233, the intelligent authentication platform 102 may establish a connection with the administrator computing device 104. For example, the intelligent authentication platform 102 may establish a third wireless data connection with the administrator computing device 104 to link the intelligent authentication platform 102 to the administrator computing device 104 (e.g., in preparation for sending an unauthorized user notification). In some instances, the intelligent authentication platform 102 may identify whether a connection is already established with the administrator computing device 104. If a connection is already established with the administrator computing device 104, the intelligent authentication platform 102 might not re-establish the connection. If a connection is not yet established with the administrator computing device 104, the intelligent authentication platform 102 may establish the third wireless data connection as described herein.

At step 234, the intelligent authentication platform 102 may send an unauthorized user notification to the administrator computing device 104 indicating that one or more unauthorized users attempted to access a sensitive application. In some instances, the intelligent authentication platform 102 may also send one or more commands directing the administrator computing device 104 to display the unauthorized user notification. For example, the intelligent authentication platform 102 may send the unauthorized user notification and the one or more commands directing the administrator computing device 104 to display the unauthorized user notification via the communication interface 113 and while the third wireless data connection is established.

At step 235, the administrator computing device 104 may receive the unauthorized user notification. In some instances, the administrator computing device 104 may also receive the one or more commands directing the administrator computing device 104 to display the unauthorized user notification. For example, the administrator computing device 104 may receive the unauthorized user notification and the one or more commands directing the administrator computing device 104 to display the unauthorized user notification while the third wireless data connection is established.

Figure 6:
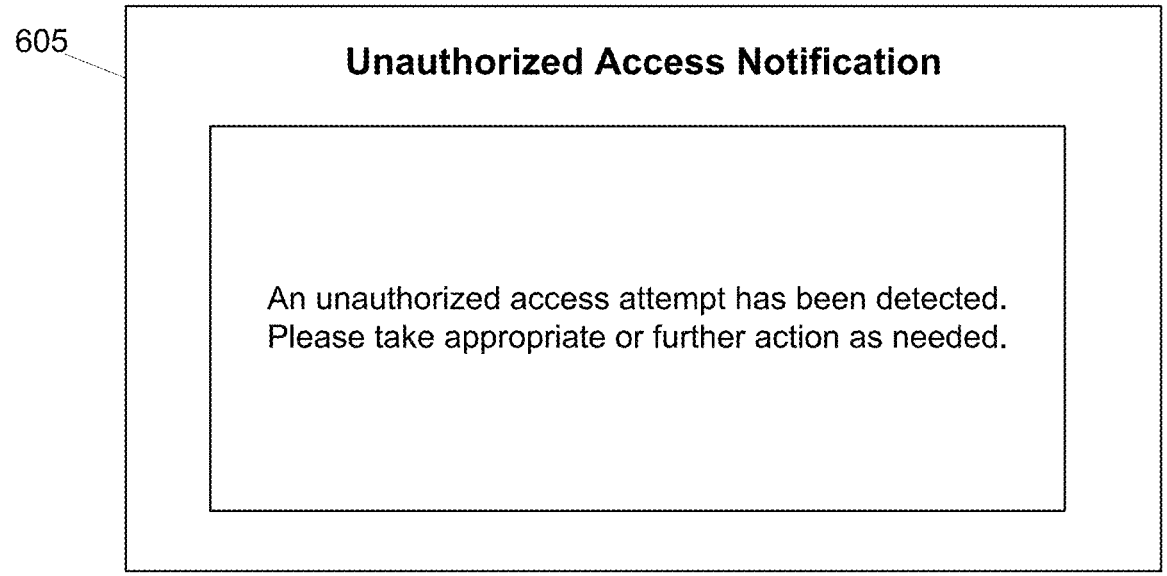

At step 236, based on or in response to the one or more commands directing the administrator computing device 104 to display the unauthorized user notification, the administrator computing device 104 may display the unauthorized user notification. For example, the administrator computing device 104 may display a graphical user interface similar to graphical user interface 605, which is illustrated in FIG. 6. For example, the administrator computing device 104 may notify a security analyst, administrator, and/or other individual that an unauthorized access attempt has been detected, and may prompt the individual to take action accordingly (or may, in some instances, cause automated remediation to occur). For example, in some instances, the administrator computing device 104 may receive user feedback re-enforcing a determination that a particular individual is not authorized to access the application interface. Additionally or alternatively, the administrator computing device 104 may receive user feedback indicating that an individual, identified as unauthorized, is in fact authorized. In either instance, the administrator computing device 104 may provide this feedback to the intelligent authentication platform 102 for use in further refining the AI engine 112c.

Figure 2H:
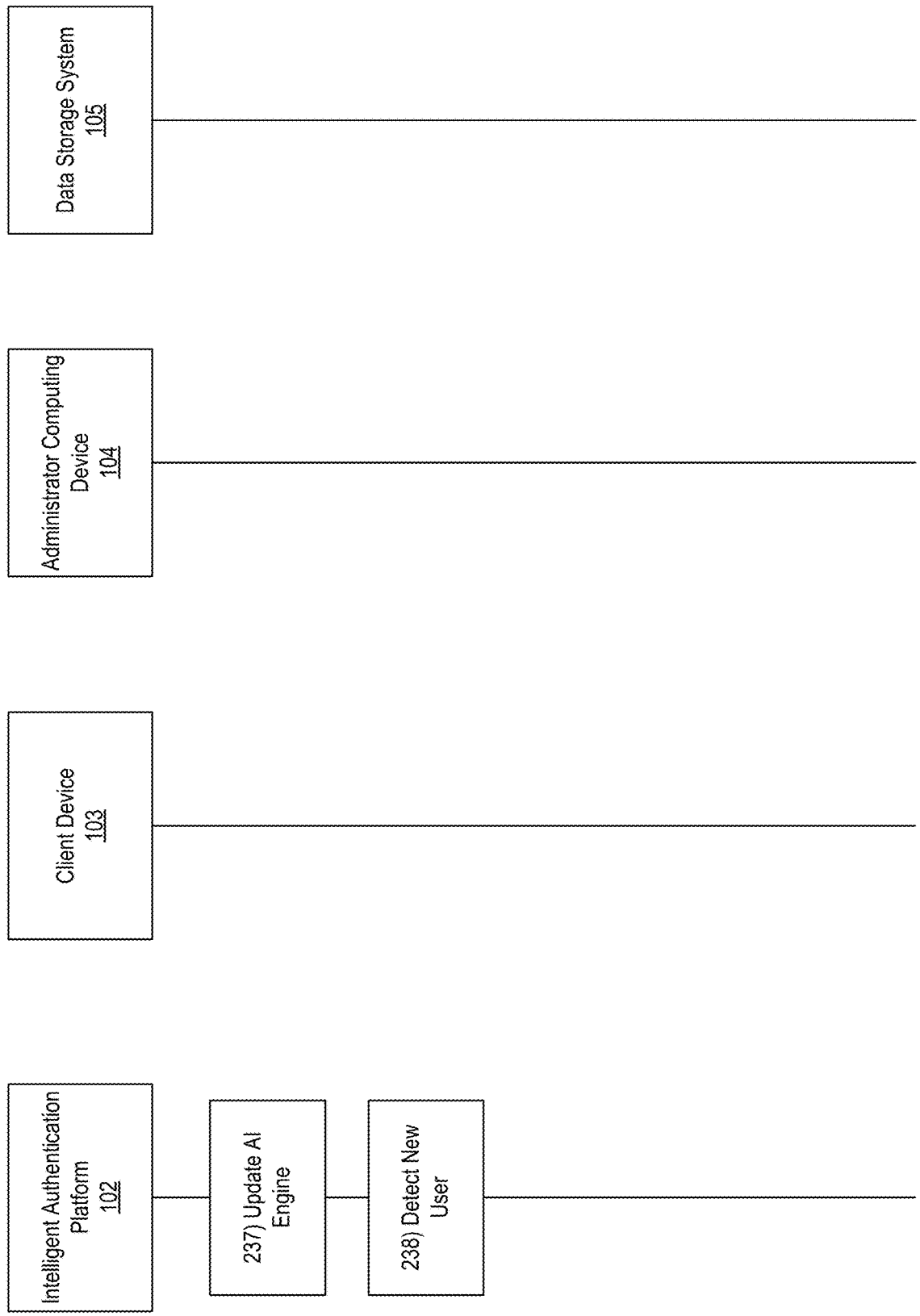

Referring to FIG. 2H, at step 237, the intelligent authentication platform 102 may dynamically refine the AI engine 112c using the faceprints, decisions about whether or not to mask application interfaces for individuals corresponding to the faceprints, the administrator feedback, and/or other information. For example, the intelligent authentication platform 102 may implement a dynamic feedback loop that may be used to iteratively refine the AI engine 112c, and thus improve performance, accuracy, and efficiency of the AI engine. Specifically, the intelligent authentication platform 102 may continue to train the AI engine 112c in a supervised manner using the above describe information.

At step 238, the intelligent authentication platform 102 may detect that a new user has entered within the predetermined distance of the client device 103. For example, the client device 103 may continuously provide the video information to the intelligent authentication platform 102 in real time for analysis. Once application interface exposure and masking decisions have been made for a particular group of individuals, present within the predetermined distance of the client device 103 at a particular time, the intelligent authentication platform 102 may maintain the implemented regular/masked displays until detection of a new individual entering the predetermined distance of the client device 103. For example, if such an individual is detected, authentication may be performed as described above. In some instances, the intelligent authentication platform 102 may similarly re-perform masking decisions based on movement of existing individuals within the predetermined distance. For example, if an unauthorized individual was previously in the periphery of the client device 103, and thus the interface was being masked for their perspective, but not masked for a user of the client device 103 (e.g., who may be directly in front of the client device 103), but now has relocated to viewing the client device 103 over the shoulder of the user of the client device 103 (or otherwise directly in front of the client device 103), the intelligent authentication platform 102 may re-perform the masking decision (which may, e.g., result in masking the user interface for both the authorized user and the unauthorized user, given that they are both now viewing the client device 103 from the same perspective). In instances where such re-authentication or re-determination of whether to mask is to be performed, the event sequence may return to steps 223 or 225 respectively.

In doing so, a method is described that addresses the current absence of a fool proof method to prevent unauthorized access to high risk applications. Continuous authentication may be performed using cognitive intelligence for employees who may, in some examples, be using high risk applications. Furthermore, access may be encrypted (e.g., greyed out) from any other viewing angles other than perpendicular to the screen using a chaotic sha-3 algorithm. In addition, continuous authentication may be performed along with viewing angle restrictions and geo-location verification to secure an application.

Figure 3:
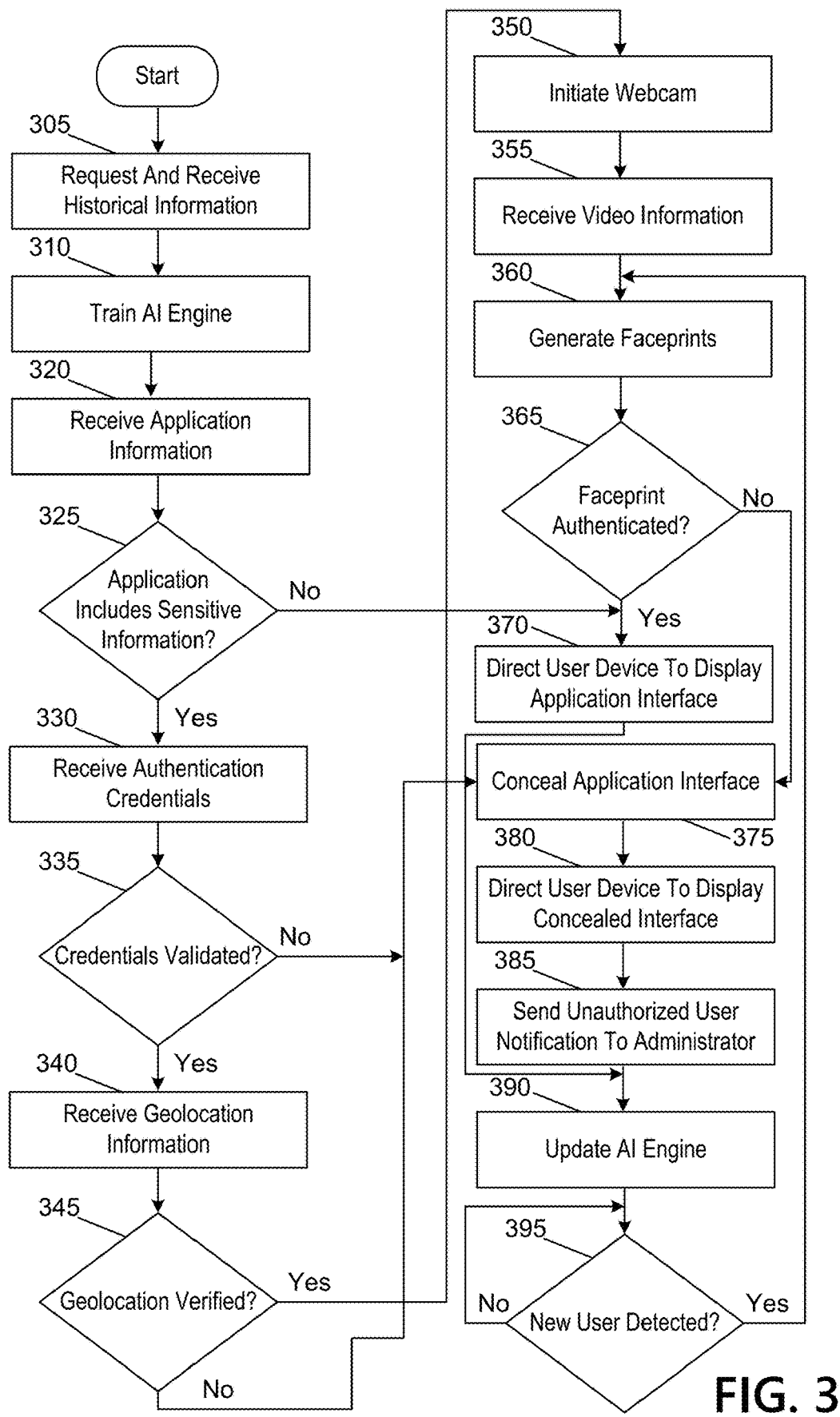
FIG. 3 depicts an illustrative method for improved user authentication and interface masking in accordance with one or more example embodiments.

FIG. 3 depicts an illustrative method for improved user authentication and interface masking in accordance with one or more example embodiments. Referring to FIG. 3, at step 305, a computing platform having at least one processor, a communication interface, and memory may request and receive historical information (e.g., image information, application information, and/or other information). At step 310, the computing platform may train an AI engine using the historical information. At step 320, the computing platform may receive current application information from a client device (e.g., from a launched application). At step 325, the computing platform may identify whether the application includes sensitive information. If the application does not include sensitive information, the computing platform may proceed to step 370. If the application does include sensitive information, the computing platform may proceed to step 330.

At step 330, the computing platform may receive authentication credentials for the application. At step 335, the computing platform may identify whether or not the authentication credentials are valid. If the authentication credentials are not valid, the computing platform may proceed to step 375. If the authentication credentials are valid, the computing platform may proceed to step 340.

At step 340, the computing platform may receive geolocation information. At step 345, the computing platform may identify whether or not the geolocation information is verified. If the geolocation is not verified, the computing platform may proceed to step 375. If the geolocation is verified, the computing platform may proceed to step 350.

At step 350, the computing platform may direct the client device to activate a webcam. At step 355, the computing platform may receive video information from the webcam/client device. At step 360, the computing platform may generate faceprints based on the video information. At step 365, the computing platform may determine whether or not the faceprints are authenticated. If the faceprints are not authenticated, the computing platform may proceed to step 375. If the faceprints are authenticated, the computing platform may proceed to step 370.

At step 370, the computing platform may direct the client device to display an unobscured interface for the application. At step 375, the computing platform may generate a masked application interface. At step 380, the computing platform may direct the client device to display a masked application interface. At step 385, the computing platform may send an unauthorized user notification to an administrator device. At step 390, the computing platform may update the AI engine based on the video information, the faceprints, administrative feedback, and/or other information. At step 395, the computing platform may identify whether a new user is detected. If a new user is detected, the computing platform may return to step 360. If no new users are detected, the computing platform may return to step 395, so as to perform continuous monitoring for new users.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
      validate, after launch of an application, initial authentication credentials for a user of a client device;
      after validating the initial authentication credentials, validate geolocation information of the client device;
      after validating the geolocation information of the client device, send one or more commands directing the client device to activate an integrated camera, wherein sending the one or more commands directing the client device to activate the integrated camera causes the client device to activate the integrated camera;
      receive, from the client device, video information indicating multiple viewpoints from perspectives of the client device, and including any individuals within a predetermined distance of the client device;
      generate, from the video information, one or more faceprints, each corresponding to one of the individuals within the predetermined distance of the client device;
      compare, using an artificial intelligence (AI) engine the one or more faceprints to stored faceprints of authenticated users;
      based on identifying that at least one of the individuals is not authenticated, mask an application user interface for the application, wherein masking the application user interface comprises:
         inputting the application user interface into a chaotic sha-3 algorithm to transform the application user interface to greyscale, wherein the inputting the application user interface into the chaotic sha-3 algorithm includes:
            scrambling pixel values of the application user interface based on a chaotic parameter input for each pixel,
            compressing the scrambled pixel values using batch normalization, and
            pooling the compressed scrambled pixel values; and
      send, to the client device, one or more commands directing the client device to display the masked application user interface, wherein sending the one or more commands directing the client device to display the masked application user interface causes the client device to display the masked application user interface.

2. The computing platform of claim 1, wherein the memory stores additional computer-readable instructions that, when executed by the at least one processor, cause the computing platform to:
   fail to validate, for a second user, the initial authentication credentials; and
   based on failing to validate the initial authentication credentials for the second user:
      mask the application user interface for the application, and
      send, to the client device, the one or more commands directing the client device to display the masked application user interface, wherein sending the one or more commands directing the client device to display the masked application user interface causes the client device to display the masked application user interface.

3. The computing platform of claim 1, wherein the memory stores additional computer-readable instructions that, when executed by the at least one processor, cause the computing platform to:
   fail to validate, for a second user, the geolocation information; and
   based on failing to validate the geolocation information for the second user:
      mask the application user interface for the application, and
      send, to the client device, the one or more commands directing the client device to display the masked application user interface, wherein sending the one or more commands directing the client device to display the masked application user interface causes the client device to display the masked application user interface.

4. The computing platform of claim 1, wherein the memory stores additional computer-readable instructions that, when executed by the at least one processor, cause the computing platform to:
   based on identifying that all of the individuals are authenticated, determine that the application user interface for the application may be displayed; and
   send, to the client device, one or more commands directing the client device to display the application user interface, wherein sending the one or more commands directing the client device to display the application user interface causes the client device to display the application user interface.

5. The computing platform of claim 1, wherein the memory stores additional computer-readable instructions that, when executed by the at least one processor, cause the computing platform to:
   receive historical image information comprising images of users and corresponding labels indicating whether or not the corresponding user is authenticated; and
   train, using the historical image information, the AI engine to distinguish between authenticated and non-authenticated users based on the one or more faceprints.

6. The computing platform of claim 1, wherein the memory stores additional computer-readable instructions that, when executed by the at least one processor, cause the computing platform to:
   receive historical application sensitivity information comprising application names and corresponding labels indicating whether or not the corresponding applications include sensitive data; and
   train, using the historical application sensitivity information, the AI engine to distinguish between applications that include the sensitive data and non-sensitive data based on current application sensitivity information.

7. The computing platform of claim 6, wherein the memory stores additional computer-readable instructions that, when executed by the at least one processor, cause the computing platform to:
   determine, using the AI engine, whether the application includes the sensitive data, wherein validating the initial authentication credentials is in response to determining that the application includes sensitive data.

8. The computing platform of claim 1, wherein the AI engine comprises a convolutional neural network (CNN).

9. The computing platform of claim 1, wherein the scrambled pixel values are uncorrelated.

10. The computing platform of claim 1, wherein the memory stores additional computer-readable instructions that, when executed by the at least one processor, cause the computing platform to:
    decrypt the masked application user interface using the chaotic parameter input.

11. The computing platform of claim 1, wherein new video information is continuously analyzed to detect a presence of a new individual within the predetermined distance, and wherein the authentication process is repeated based on detection of the presence of the new individual.

12. The computing platform of claim 1, wherein the memory stores additional computer-readable instructions that, when executed by the at least one processor, cause the computing platform to:
    identify whether or not the application comprises a sensitive application, wherein masking the application user interface is based on identifying that the application does comprise the sensitive application.

13. The computing platform of claim 1, wherein masking the application user interface comprises masking the application user interface via a hybrid masking procedure that causes the application user interface to appear masked to individuals located in a periphery of the client device and causes the application user interface to appear in an unmasked form to the user.

14. The computing platform of claim 10, wherein decrypting the masked application user interface comprises masking the application user interface using one or more of convolutional decoding, batch normalization, upsampling, or a softmax method.

15. A method comprising:
    at a computing platform comprising at least one processor, a communication interface, and memory:
       validating, after launch of an application, initial authentication credentials for a user of a client device;
       after validating the initial authentication credentials, validating geolocation information of the client device;
       after validating the geolocation information of the client device, sending one or more commands directing the client device to activate an integrated camera, wherein sending the one or more commands directing the client device to activate the integrated camera causes the client device to activate the integrated camera;
       receiving, from the client device, video information indicating multiple viewpoints from perspectives of the client device, and including any individuals within a predetermined distance of the client device;
       generating, from the video information, one or more faceprints, each corresponding to one of the individuals within the predetermined distance of the client device;
       comparing, using an artificial intelligence (AI) engine the one or more faceprints to stored faceprints of authenticated users;
       based on identifying that at least one of the individuals is not authenticated, masking an application user interface for the application, wherein masking the application user interface comprises:
          inputting the application user interface into a chaotic sha-3 algorithm to transform the application user interface to greyscale, wherein the inputting the application user interface into the chaotic sha-3 algorithm includes:
             scrambling pixel values of the application user interface based on a chaotic parameter input for each pixel,
             compressing the scrambled pixel values using batch normalization, and
             pooling the compressed scrambled pixel values; and
       sending, to the client device, one or more commands directing the client device to display the masked application user interface, wherein sending the one or more commands directing the client device to display the masked application user interface causes the client device to display the masked application user interface.

16. The method claim 15, further comprising:
    failing to validate, for a second user, the initial authentication credentials; and
    based on failing to validate the initial authentication credentials for the second user:

masking the application user interface for the application, and sending, to the client device, the one or more commands directing the client device to display the masked application user interface, wherein sending the one or more commands directing the client device to display the masked application user interface causes the client device to display the masked application user interface.

17. The method of claim 15, further comprising:

failing to validate, for a second user, the geolocation information; and based on failing to validate the geolocation information for the second user:

masking the application user interface for the application, and sending, to the client device, the one or more commands directing the client device to display the masked application user interface, wherein sending the one or more commands directing the client device to display the masked application user interface causes the client device to display the masked application user interface.

18. The method of claim 15, further comprising:

based on identifying that all of the individuals are authenticated, determining that the application user interface for the application may be displayed; and sending, to the client device, one or more commands directing the client device to display the application user interface, wherein sending the one or more commands directing the client device to display the application user interface causes the client device to display the application user interface.

19. The method of claim 15, further comprising:

receiving historical image information comprising images of users and corresponding labels indicating whether or not the corresponding user is authenticated; and training, using the historical image information, the AI engine to distinguish between authenticated and non-authenticated users based on the one or more faceprints.

20. One or more non-transitory computer-readable media storing instructions that, when executed by a computing platform comprising at least one processor, a communication interface, and memory, cause the computing platform to:

validate, after launch of an application, initial authentication credentials for a user of a client device;

after validating the initial authentication credentials, validate geolocation information of the client device;

after validating the geolocation information of the client device, send one or more commands directing the client device to activate an integrated camera, wherein sending the one or more commands directing the client device to activate the integrated camera causes the client device to activate the integrated camera;

receive, from the client device, video information indicating multiple viewpoints from perspectives of the client device, and including any individuals within a predetermined distance of the client device;

generate, from the video information, one or more faceprints, each corresponding to one of the individuals within the predetermined distance of the client device;

compare, using an artificial intelligence (AI) engine the one or more faceprints to stored faceprints of authenticated users;

based on identifying that at least one of the individuals is not authenticated, mask an application user interface for the application, wherein masking the application user interface comprises:

inputting the application user interface into a chaotic sha-3 algorithm to transform the application user interface to greyscale, wherein the inputting the application user interface into the chaotic sha-3 algorithm includes:

scrambling pixel values of the application user interface based on a chaotic parameter input for each pixel, compressing the scrambled pixel values using batch normalization, and pooling the compressed scrambled pixel values; and send, to the client device, one or more commands directing the client device to display the masked application user interface, wherein sending the one or more commands directing the client device to display the masked application user interface causes the client device to display the masked application user interface.

* * * * *

UNITED STATES PATENT AND TRADEMARK OFFICE
CERTIFICATE OF CORRECTION

| | | |
|---|---|---|
| PATENT NO. | : 12,107,852 B2 | Page 1 of 1 |
| APPLICATION NO. | : 17/669715 | |
| DATED | : October 1, 2024 | |
| INVENTOR(S) | : Nagaraj Nilgiri et al. | |

It is certified that error appears in the above-identified patent and that said Letters Patent is hereby corrected as shown below:

On the Title Page (72), First named inventor:
Please delete "Nagarai Nilgiri" and insert --Nagaraj Nilgiri--

Signed and Sealed this
Thirtieth Day of September, 2025

John A. Squires
*Director of the United States Patent and Trademark Office*